UNITED STATES PATENT OFFICE.

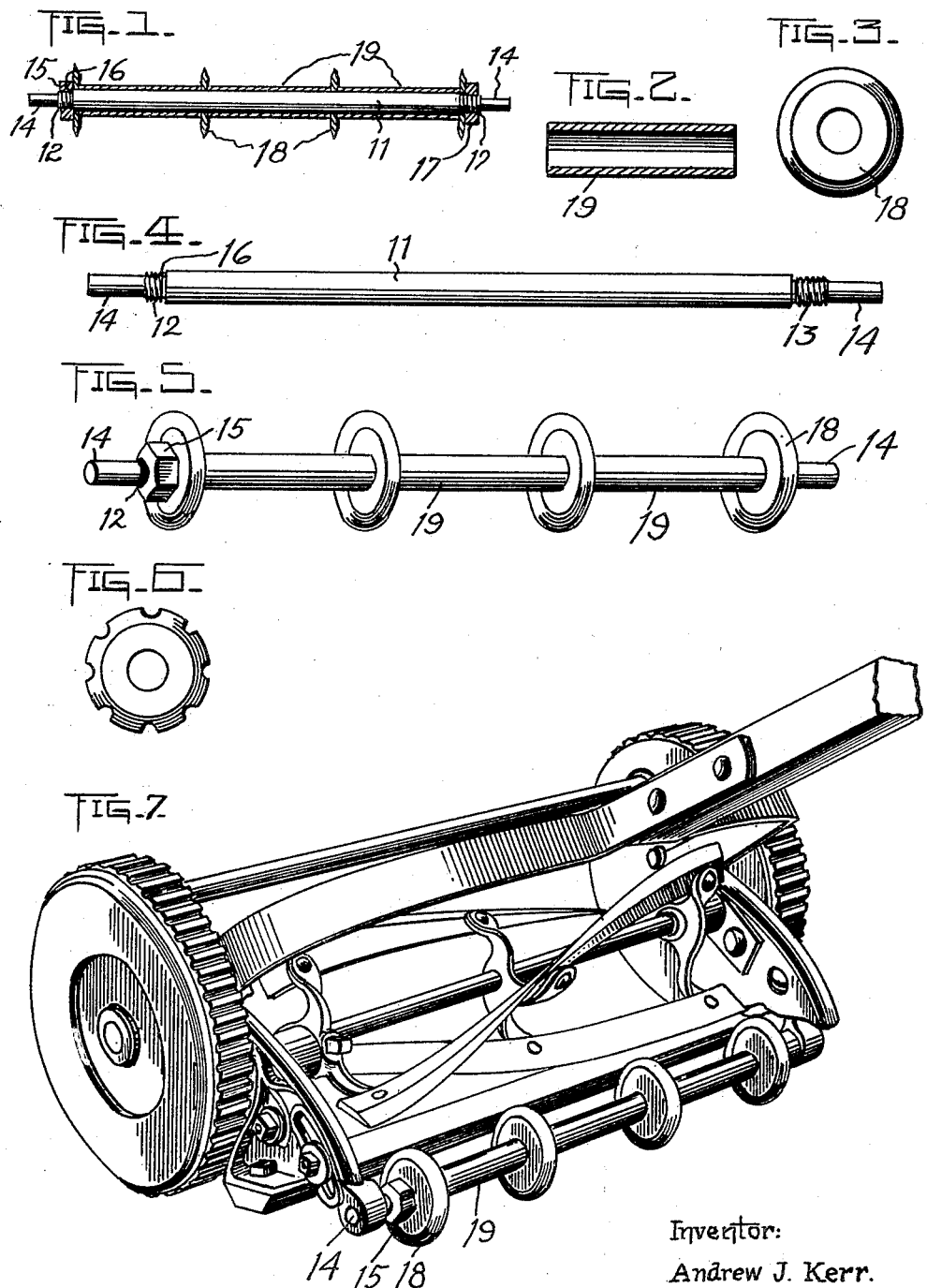

ANDREW J. KERR, OF LOS ANGELES, CALIFORNIA, ASSIGNOR OF FIFTY-ONE PER CENT. TO ANNA M. PACHMAYR, OF LOS ANGELES, CALIFORNIA.

BERMUDA-GRASS CUTTER AND LAWN-AERATOR.

1,385,007.     Specification of Letters Patent.     Patented July 19, 1921.

Application filed November 18, 1920. Serial No. 424,887.

*To all whom it may concern:*

Be it known that I, ANDREW J. KERR, a citizen of the United States, residing in the city and county of Los Angeles and State of California, have invented a new and useful Bermuda-Grass Cutter and Lawn-Aerator, of which the following is a specification.

This invention relates to an improved attachment for lawn-mowers, and especially to a device which may be substituted for the roller element of the lawn-mower, and which may be utilized for aerating and loosening the soil simultaneously with the mowing operation, for cutting weeds which grow close to the ground, for increasing the permeability of the soil to moisture, and to increase the seed germinating capacity when additional seeding of the lawn is desired.

Heretofore an annoyance in producing a good lawn consists in the growth of Bermuda grass along with the preferred varieties, forming a heavy growth which chokes out the regular lawn grasses, and which necessitates digging out the objectional growth and reseeding that portion of the lawn.

It is an object to provide means for cutting the runners and thereby preventing the spreading of the Bermuda grass, and to provide means whereby this may be accomplished simultaneously with the mowing operation.

Another object of this invention is to provide a cutting and soil-stirring device which may be attached to any lawn-mower, and of such comparatively light construction and design that the operator may actuate the mower as readily as with the roller element for which this device is substituted.

Another object is to provide detachable and interchangeable spacing elements for the cutting elements, whereby the depth of cut taken by the cutting elements may be adjusted by substituting various sizes of the spacing elements, one for another.

Another object of this invention is to provide means for forcing into the soil a portion of the cut grass, whereby the standing grass is fertilized.

My invention consists further in constructing the shaft element, the cutting elements and the spacing elements, so that all are held together by one nut on the shaft element, and whereby a lateral adjustment of the cutting elements may be made upon the shaft element, so that, upon operating the mower back upon the same path, the soil will be aerated and broken in alteration with the first operation.

The preferred means by which I have accomplished the objects of my invention are illustrated in the accompanying drawings and are hereinafter specifically described, That which I believe to be new is set forth in the claims.

Upon the annexed drawings, Figure 1 is a longitudinal and sectional view of my device. Fig. 2 is a sectional view of a spacing element which determines the position of the cutting elements. Fig. 3 is a side view of a cutting element. Fig. 4 is a side view of the supporting shaft for the cutting elements. Fig. 5 is a perspective view of the device with cutting and spacing elements assembled on the shaft. Fig. 6 is a side view of a modified form of cutting element. Fig. 7 is a perspective view of a lawn-mower with my improved device substituted for the roller part.

In the practical construction of my lawn-mower attachment, the shaft 11, is provided with threaded portions 12 and 13, and with trunnion ends 14. A nut 15 is attached to the threaded portion 12, of the shaft, and is screwed tightly against the shoulder 16. On the opposite threaded portion 13, a clamping nut 17 is provided. The rotary cutters 18 are mounted on the shaft, and are maintained in spaced relation by the spacing elements 19, and clamped in position by the nut 17. If preferred, cutting elements as shown in Fig. 6, may be substituted for the plain cutters 18. The spacing elements 19 may be made in various sizes, and adjustment for depth of cut made by substituting one size for another.

In use, the device is substituted for the roller which usually forms a part of the mower. The mower is then operated over the lawn in the usual manner to cut the grass. The grass cutting and soil aerating device which I have provided will then cut the grass, loosen up the soil, and turn a portion of the cut grass in the ground. Adjustment of the device for depth of cut is made by changing the spacing elements for similar ones of larger or smaller diameter. The position of the cutting elements is changed by substituting different spacing elements. The spacing elements, being of cylindrical form, will further serve to roll the lawn.

From the foregoing it may be seen that I have provided a simple and efficient device for accomplishing the objects of the invention, and the elements thereof as well adapted to serve the purposes intended, but it is to be understood that changes and alterations may be made which may fall within the scope of the appended claims.

What is claimed is:

1. In a lawn-mower attachment, the combination with a shaft adapted to be substituted for the roller, of circular disk cutting elements mounted thereon, and spacing elements disposed between the cutting elements.

2. In a lawn-mower attachment, the combination with a shaft having a central cylindrical portion, a threaded portion, and trunnion ends, of circular disk cutting elements disposed on the central portion, spacing elements disposed between the cutting elements, and clamping nuts on the threaded portion and serving to maintain the cutting elements and spacing elements in position.

3. In a lawn-mower attachment, the combination with a shaft having a central cylindrical portion, threaded portions adjacent thereto, and trunnion ends adapted to engage with the roller supporting brackets, of disk cutting elements disposed on the shaft, spacing elements concentric with the shaft and determining the position of the cutting elements, and clamping nuts on the threaded portions of the shaft and maintaining the spacing and cutting elements in the assembled form.

4. In a lawn-mower attachment, the combination with a shaft adapted to be mounted in the lawn roller brackets, of cutting means mounted on the shaft, and spacing means for the cutting means mounted on the shaft and maintaing the cutting means in position.

5. In a lawn-mower attachment, the combination with a shaft, of cutters mounted thereon and having a circular cutting edge, spacing elements mounted on the shaft and determining the position of the cutting elements, and clamping means for maintaining the cutting and spacing elements in assembled form.

6. In a lawn-mower attachment, the combination with a shaft, of circular cutters mounted thereon and having a notched cutting edge, spacing elements for the cutting elements, and clamping means for the cutting and spacing elements.

In testimony whereof, I hereunto affix my signature this third day of November, 1920.

ANDREW J. KERR.